United States Patent
Golovashchenko

(10) Patent No.: US 9,522,419 B2
(45) Date of Patent: Dec. 20, 2016

(54) METHOD AND APPARATUS FOR MAKING A PART BY FIRST FORMING AN INTERMEDIATE PART THAT HAS DONOR POCKETS IN PREDICTED LOW STRAIN AREAS ADJACENT TO PREDICTED HIGH STRAIN AREAS

(75) Inventor: Sergey Fedorovich Golovashchenko, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 366 days.

(21) Appl. No.: 13/045,878

(22) Filed: Mar. 11, 2011

(65) Prior Publication Data

US 2011/0179846 A1    Jul. 28, 2011

Related U.S. Application Data

(63) Continuation-in-part of application No. 12/115,026, filed on May 5, 2008.

(51) Int. Cl.
| | | |
|---|---|---|
| *B21D 22/24* | (2006.01) | |
| *B21D 22/00* | (2006.01) | |
| *B21D 37/08* | (2006.01) | |
| *C21D 7/02* | (2006.01) | |
| *G06F 17/50* | (2006.01) | |

(Continued)

(52) U.S. Cl.
CPC .............. *B21D 22/24* (2013.01); *B21D 22/00* (2013.01); *B21D 37/08* (2013.01); *C21D 7/02* (2013.01); *G06F 17/5018* (2013.01); *C21D 1/673* (2013.01); *C21D 9/48* (2013.01); *C21D 2221/00* (2013.01); *C21D 2221/10* (2013.01); *G06F 2217/42* (2013.01)

(58) Field of Classification Search
CPC ......... B21D 13/06; B21D 22/00; B21D 22/02; B21D 22/04; B21D 22/205; B21D 22/26
USPC  72/60, 349, 347, 348, 379.2, 380, 381, 385, 72/379.6, 412, 414, 415, 470, 475
See application file for complete search history.

(56) References Cited

U.S. PATENT DOCUMENTS

| | | |
|---|---|---|
| 3,232,086 A | 2/1966 | Inoue |
| 3,394,569 A | 7/1968 | Smith |

(Continued)

FOREIGN PATENT DOCUMENTS

| | | |
|---|---|---|
| CN | 1693001 | 11/2005 |
| CN | 1876266 | 12/2006 |

(Continued)

OTHER PUBLICATIONS

Kalpakjian & Schmid, Manufacturing Engineering and Technology, 2001, Prentice Hall, Fourth Edition, pp. 992-997 and 1073-1079.*

(Continued)

*Primary Examiner* — Matthew G Katcoff
(74) *Attorney, Agent, or Firm* — Damian Porcari; Brooks Kushman P.C.

(57) ABSTRACT

A method of forming a part that has areas of high strain and predicted areas of low strain from a blank and method of designing a die for forming such a part. Predicted areas of low strain are identified that are adjacent to predicted areas of high strain. A pre-forming die is designed to form the blank to provide a donor pocket in an intermediate part in a predicted low strain area that is adjacent to the predicted high strain area. The donor pocket of the intermediate part is drawn into the predicted high strain area while forming the intermediate part into the part.

9 Claims, 2 Drawing Sheets

(51) Int. Cl.
C21D 1/673 (2006.01)
C21D 9/48 (2006.01)

(56) References Cited

U.S. PATENT DOCUMENTS

| | | | |
|---|---|---|---|
| 3,423,979 A | 1/1969 | Smith et al. | |
| 3,491,564 A | 1/1970 | Hundley et al. | |
| 3,512,384 A | 5/1970 | Inoue | |
| 3,566,645 A | 3/1971 | Lemelson | |
| 3,593,551 A | 7/1971 | Roth | |
| 3,774,430 A | 11/1973 | Greer et al. | |
| 4,347,726 A * | 9/1982 | Naslund | 72/385 |
| 4,409,808 A * | 10/1983 | Festag et al. | 72/60 |
| 4,543,811 A * | 10/1985 | Aoyama | 72/332 |
| 4,942,750 A | 7/1990 | Conaway | |
| 5,632,172 A | 5/1997 | Kasmacher | |
| 5,911,844 A | 6/1999 | Benedyk | |
| 5,941,110 A | 8/1999 | Cao et al. | |
| 5,948,185 A | 9/1999 | Krajewski et al. | |
| 5,974,847 A | 11/1999 | Saunders et al. | |
| 6,033,499 A | 3/2000 | Mitra | |
| 6,227,023 B1 | 5/2001 | Daehn et al. | |
| 6,349,467 B1 | 2/2002 | Karafillis et al. | |
| 6,519,992 B1 | 2/2003 | Schnupp | |
| 6,581,428 B1 | 6/2003 | Friedman | |
| 6,615,631 B2 | 9/2003 | Kleber et al. | |
| 6,675,620 B1 | 1/2004 | Heyll et al. | |
| 6,880,377 B2 | 4/2005 | Kim et al. | |
| 6,947,809 B2 | 9/2005 | Ren et al. | |
| 7,028,519 B2 * | 4/2006 | Kim et al. | 72/60 |
| 7,093,470 B2 * | 8/2006 | El-Soudani | 72/56 |
| 7,130,708 B2 | 10/2006 | Wang et al. | |
| 7,165,429 B2 | 1/2007 | Steingroever | |
| 7,240,532 B2 | 7/2007 | Zhang et al. | |
| 7,266,982 B1 | 9/2007 | Guza | |
| 7,363,790 B2 | 4/2008 | Kruger et al. | |
| 7,389,665 B1 | 6/2008 | Luckey, Jr. et al. | |
| 2005/0199032 A1 | 9/2005 | Krajewski | |
| 2006/0185413 A1 | 8/2006 | Nobata | |
| 2006/0201229 A1 | 9/2006 | Zhu et al. | |
| 2008/0105023 A1 | 5/2008 | Golovashchenko et al. | |
| 2008/0229802 A1 | 9/2008 | Simris | |
| 2009/0272171 A1 | 11/2009 | Golovashchenko | |
| 2010/0172606 A1 * | 7/2010 | Lunz et al. | 384/490 |

FOREIGN PATENT DOCUMENTS

| | | |
|---|---|---|
| DE | 19624036 A1 | 12/1997 |
| JP | 57195549 | 12/1982 |
| JP | 62240702 A | 10/1987 |
| JP | 5212464 A | 8/1993 |
| JP | 2008036658 A | 2/2008 |

OTHER PUBLICATIONS

"Optimization of Initial Blank Shape Predicted Based on Inverse Finite Element Method," Science Direct, Finite Elements in Analysis and Design 43 (2007), pp. 218-233.

"General Motors' Quick Plastic Forming Process," James G. Schroth, TMS (The Minerals, Metals and Materials Society), 2004, pp. 9-20.

FY 2005 Progress Report, Automotive Lightweighting Materials, pp. 136-140.

"Demonstration of the Preform Anneal Process to Form a One-Piece Aluminum Door Inner Panel," Lee et al. SAE Technical Paper Series, No. 2006-01-0987, 2006 SAE World Congress, Detroit, MI, Apr. 3-6, 2006.

"Retrogression Heat Treatments in AA6111" Paul E. Krajewski, General Motors R&D Center, Materials and Processing Laboratory, Oct. 23, 2002.

"Metal Forming with Capacitor Discharge Electro-Spark," E.C. Schrom, paper SP62-80, published in Advanced High Energy Rate Forming. Book II, ASTME 1962P.

"Research in Electric Discharge Forming Materials," R.L. Kegg et al., Paper SP62-78, published in Advanced High Energy Rate Forming, Book II, ASTME, 1962.

"Formability of Sheet Metal with Pulsed Electromagnetic and Electrohydraulic Technologies," S.F. Golovashchenko, et al. Proceedings of TMS Symposium "Asluminum—2003," San Diego, CA 2003.

"The Effect of Tool/Sheet Interaction in Damage Evolution of Electromagnetic Forming of Aluminum Alloy Sheet," J. Imbert et al., Transaction ASTME, Journal of Engineering Materials and Technology, Jan. 2005, vol. 127, pp. I 145-153.

"Heat Treating, Cleaning and Finishing," Metals Handbook, 8th Ed., vol. 2, Amer. Soc. for Metals, pp. 277-278.

* cited by examiner

METHOD AND APPARATUS FOR MAKING A PART BY FIRST FORMING AN INTERMEDIATE PART THAT HAS DONOR POCKETS IN PREDICTED LOW STRAIN AREAS ADJACENT TO PREDICTED HIGH STRAIN AREAS

CROSS-REFERENCE TO RELATED APPLICATIONS

This application is a continuation-in-part of U.S. application Ser. No. 12/115,026 filed May 5, 2008, the disclosure of which is incorporated in its entirety by reference herein.

STATEMENT REGARDING FEDERALLY SPONSORED RESEARCH OR DEVELOPMENT

The invention was made with Government support under Contract No. DE-FG36-08G018128. The Government has certain rights to the invention.

TECHNICAL FIELD

The present invention relates to a method of forming a part and of designing a pre-forming die to reduce strain in high strain areas of a part.

BACKGROUND

Parts formed from sheet metal are generally formed in stamping operations in which stamping presses provided with sheet metal fabrication dies are used to form a part in a series of steps. Parts having complex shapes may have deep draw geometries that exceed the forming limits of the metal. The depth of cavities formed in sheet metal parts is limited by the maximum strain in local areas that may result in splits, even though the other parts of the blank may have a low level of strain. Advanced high strength steel (AHSS) alloys are stronger than low carbon steel and may be specified to reduce weight. However, AHSS alloys have less ductility and are more prone to splitting in high strain areas.

Highly ductile low carbon steel is less prone to the formation of splits in high strain areas than AHSS alloys. However, ductile low carbon steel has less strength than high strength steel alloys. To assure adequate structural strength, the thickness of panels made out of mild steel may be increased. However, increasing panel thickness tends to also increase the expense of the part due to higher material costs. Thicker panels also reduce fuel economy due to the added weight of the panel.

Applicant's prior patent application U.S. application Ser. No. 12/115,026 discloses a method of forming a part and a method of designing a part from lightweight high-strength material. Critical areas including deep pockets and sharp radius areas of the final part are identified and are pre-formed into an intermediate part in Applicant's prior application. In the intermediate part, broad radius areas are formed in a pre-form in the same location as the areas that are subsequently formed into deep pockets and sharp corners. While this approach is still considered to be a viable solution, Applicant proposes additional concepts in this application as summarized below.

SUMMARY

According to one aspect of the present disclosure, a method is disclosed for forming a planar blank into a part that would otherwise have areas of high strain and areas of low strain. The blank is formed to provide at least one donor pocket in an intermediate step. The donor pocket is subsequently drawn into at least one otherwise high strain area that is proximate the donor pocket when the final part is formed.

According to another aspect of the present disclosure, a method of designing a pre-forming die is disclosed for forming a part that would normally have high strain areas and low strain areas. The method includes identifying in the final part low strain areas that are adjacent to high strain areas that would be created, if the part were to be formed using conventional sheet metal forming processes. The pre-forming die is designed to form the blank to provide a donor pocket in the pre-form in the otherwise low strain areas that are adjacent to the otherwise high strain areas. The donor pocket of the intermediate part is drawn into the otherwise high strain area while forming the intermediate part into the final part.

According to other aspects of the disclosure, the method may further comprise identifying areas of high strain and low strain in the part if the part was to be formed in a stamping operation or in a one-sided forming process, such as hydro-forming (HF), electro-hydraulic forming (EHF), electro-magnetic forming (EMF), explosive forming (EF), or the like. The areas of high strain and low strain are referred to herein as predicted areas of high and low strain. The predicted strain refers to strain levels that are predicted to be created in a conventional forming process. Strain levels in predicted areas of high strain are reduced by applying the concepts disclosed in this application.

Depending upon the design of the panel, a plurality of donor pockets may be formed in each of a plurality of predicted low strain areas. The donor pocket may be formed in a direction that is opposite to the direction in which the pre-form is drawn to form the part. In one embodiment, the donor pocket may be formed into an arcuate cross-sectional shape.

According to still further aspects of the present disclosure, the part may be modeled to identify the areas of predicted high strain and the areas of predicted low strain in the part when formed in a stamping operation. Areas of predicted low strain are identified that are adjacent to areas of predicted high strain. The blank is pre-formed in the areas of predicted low strain that are adjacent areas of predicted high strain.

The predicted areas of high and low strain may be determined by forming a test blank in a conventional forming process that is marked with a grid to define the areas of high strain and the areas of the low strain of the stamped part. Alternatively, the predicted areas of high and low strain may be simulated by computer modeling using finite element analysis. The donor pocket may be designed by the following procedure 1) assigning values of strain tensor components with opposite signs to discrete areas of the finite element mesh that encounter high strain and to adjacent areas that encounter low strain; 2) introducing elastic stresses in the flat blank with initial finite element mesh calculating these stress tensor components using Hook's law based upon the strain tensor components as calculated in step 1; 3) applying boundary conditions in the form of flat plates, which permit only in-plane displacement of the areas corresponding to high strain and having open windows allowing material in the areas of low strain to bulge into the open windows driven by compressive forces in the areas between the flat plates. The part may be analyzed to identify discrete areas of higher strain in the part and specifying the donor pocket which is drawn into the high strain area during the process of forming the final shape.

These and other objects and advantages of the present disclosure will be better understood in view of the attached drawings and the following detailed description of the illustrated embodiment.

DETAILED DESCRIPTION

Detailed embodiments of the present invention are disclosed in this application, however, it is to be understood that the disclosed embodiments are merely exemplary. The invention may be embodied in various and alternative forms. The figures are not necessarily to scale and some features may be exaggerated or minimized to show details of particular components. The specific structural and functional details disclosed are not to be interpreted as limiting, but merely as a representative basis for teaching one skilled in the art how to practice the present invention.

Figure 1:
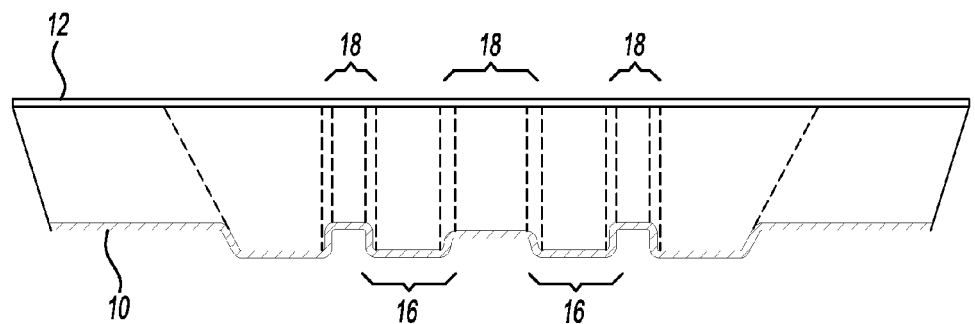
FIG. 1 is a diagrammatic view showing a planar blank disposed above a part that has predicted areas of high strain and low strain.

Referring to FIG. 1, a part 10 is shown disposed below a blank 12. The blank 12 is formed in either a conventional sheet metal forming operation or in a one-sided forming process. Based upon finite element analysis, part design data, or other analysis of the final part 10 shape, predicted areas of high strain 16 and areas of low strain 18 are identified in the part 10. These predicted areas are correlated to their location of origin in the blank 12. In particular, areas of the blank 12 that are identified as predicted areas of low strain in the finished part 10 are pre-formed in an intermediate part as will be described below with reference to FIG. 2.

Figure 2:
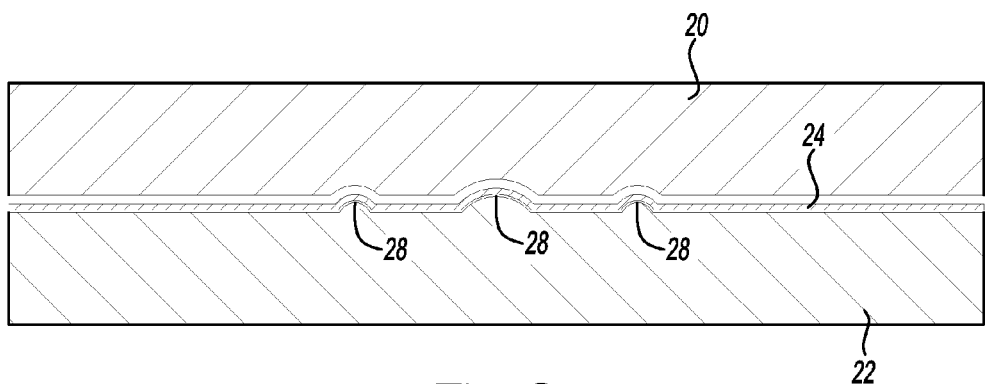
FIG. 2 is a cross-sectional view of a die set used to form an intermediate part that forms the predicted areas of low strain in a direction opposite to the direction that the blank is stamped to form a final part.

Referring to FIG. 2, an upper pre-form die 20 and a lower pre-form die 22 are shown engaging an intermediate part 24. The intermediate part 24 is formed by the upper pre-form die 20 and the lower pre-form die 22 to form donor pockets 28 having an arcuate cross section. The donor pockets 28 are formed in areas that were previously identified in the blank 12 as being the predicted areas of low strain 18.

Figure 3:
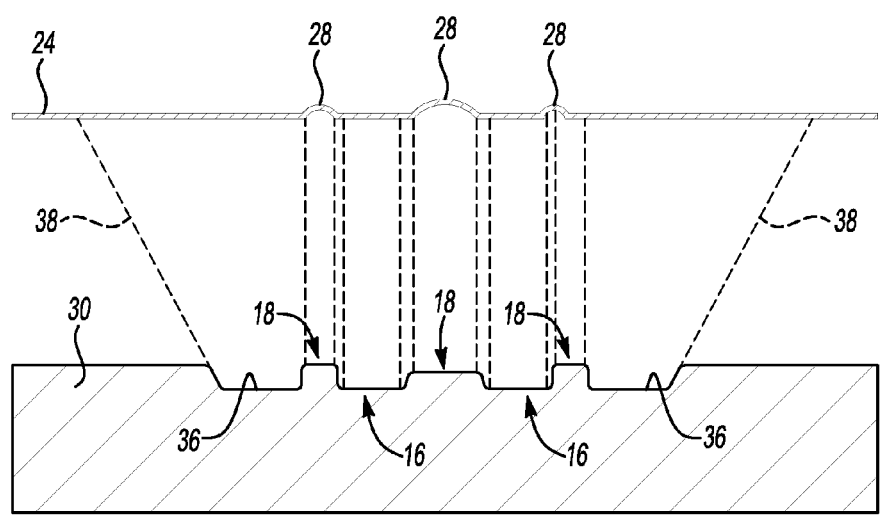
FIG. 3 is a diagrammatic cross-sectional view showing an intermediate part disposed over a die that is used to form the final part.

Referring to FIG. 3, the intermediate part 24 is shown disposed above a part forming lower die 30. The part forming lower die 30 defines the shape of the part 10. An intermediate part 24 is located in the lower die 30 and then may be formed by either a conventional sheet metal press or a one-sided forming process, such as HF, EHF, EMF, SPF, EF and the like. As the intermediate part 24 is formed into the final part shape 10, metal is drawn from the donor pockets 28 into the predicted areas of high strain 16. The additional metal afforded by the donor pockets 28 reduces the strain in the predicted areas of high strain 16 because additional metal is available to flow from the donor pockets into the predicted areas of high strain 16.

Peripheral areas 36 are shown in the part forming lower die 30 that are not areas of high strain 16 because of the availability of material from the peripheral portions of the intermediate part 24 to be drawn into the peripheral areas 36. Material flow is indicated by material flow direction lines 38 from the outer portion of the intermediate part 24 toward the peripheral areas 36. This is contrasted with the material drawn into the areas of high strain 16 from the arcuate cross-section donor pockets 28. The donor pockets 28 provide material from the intermediate part 24 that may be drawn into the predicted areas of high strain 16.

Figure 4A:
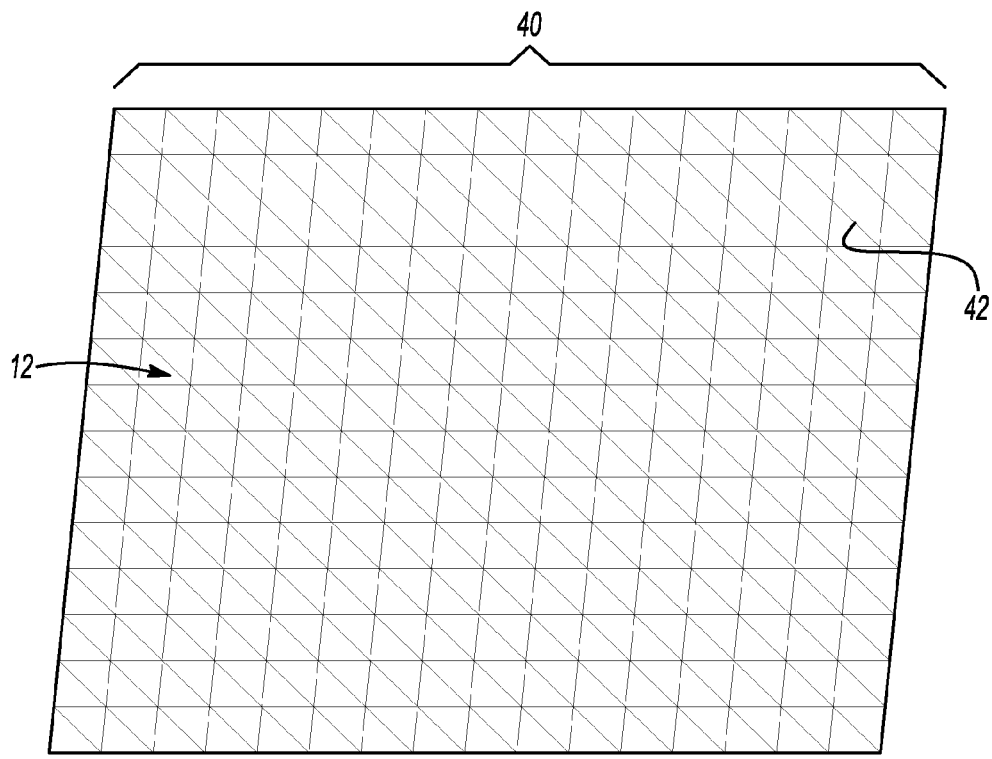
FIGS. 4a and 4b are diagrammatic views of a panel marked with a finite element analysis grid with FIG. 4a showing the panel before stamping and FIG. 4b showing the panel after stamping.
Figure 4B:
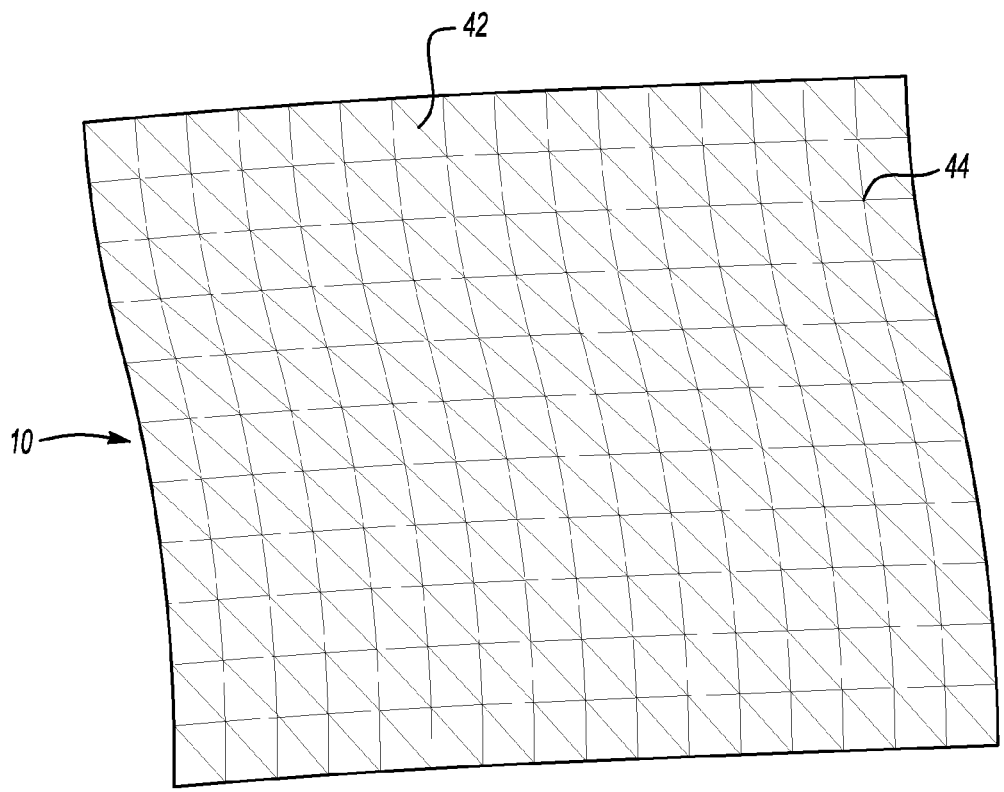

Referring to FIGS. 4a and 4b, a finite element analysis method of determining the strain in the final part 10 is illustrated. In FIG. 4a, a blank 12 marked with a grid 40 of polygonal shapes 42 is shown before being formed. In FIG. 4b, the part 10 is shown after being formed. In areas of low strain, the polygons 42 have only minor distortions. In areas of high strain, the polygonal shapes 42 are stretched and form distorted polygonal shapes 44. The distortion of the polygons may be measured and compared to the original size of the polygons of the grid 40 to obtain a value for strain caused by the drawing operation in discrete local areas.

In one embodiment, the donor pocket is designed based upon the following analytical procedure: The sheet metal forming process is modeled based upon finite element analysis to obtain data relating to the distribution of strains in the blank after the sheet metal forming process is completed. Some local areas may be expected to exceed maximum strains from the forming limit diagram. If no adjustment is made, these areas would split during stamping. The areas where high strains are predicted and low strains are predicted are obtained by analyzing the distribution of strains in the stamped part. The areas of predicted low strain that are adjacent to the areas of predicted high strain are selected.

The areas in the flat blank are identified that correspond to the areas on the stamped part with predicted high strain and adjacent to the areas of predicted low strain. Identifying this correspondence based on finite element analysis is performed to identify the corresponding areas with fine numerical mesh with no remeshing during the sheet metal forming process. The numbers of finite elements belonging to predicted areas of high strain that are adjacent to predicted areas of low strain are used to establish an accurate correspondence between the areas of the stamped part and flat blank.

An additional numerical procedure is conducted to identify the donor pockets in the areas of flat blank corresponding to predicted low strain areas on the stamped part. In this numerical procedure, the flat blank is positioned between two flat plates restricting the out-of-plane displacement of the flat blank. In the areas of predicted high strain and low strain, introduce internal stresses calculated based on Hook's law from strains in the stamped blank in corresponding areas of predicted low strain and high strain. The strain tensor components in designated areas should be taken with the opposite sign while being introduced in the flat blank to create a pre-stressed condition in the flat blank.

Displacement of the flat blank is limited in-plane with the only exception being the open donor pockets in the areas of predicted low strain. The internal elastic stresses corresponding to the introduced strains will push the material of the flat blank into the open windows until the internal stresses are balanced. The flat sheet bulges into the open windows driven by the in-plane compressive stresses. These bulged areas have shapes corresponding to the shapes of donor pockets that are formed during preforming operation.

The suggested preforming process is validated by modeling the two-step forming process. The strain distribution obtained from this process is compared with previously conducted modeling of the process.

Computer simulation based on CAD data may also be used to predict areas of low strain and high strain in the part 10. Once the predicted areas are identified, parts may be tried out and further refinements in the intermediate part 24 may be made to further redistribute strain in the final part 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming a part that has a predicted area of high strain and a predicted area of low strain from a blank comprising:

forming the blank between a first upper die and a first lower die that each include a plurality of donor pocket forming areas to provide a plurality of donor pockets within an intermediate part in a plurality of predicted low strain areas, each of the donor pockets immediately adjacent to a plurality of predicted areas of high strain, and each of the donor pockets having an arcuate cross-section; and on a second lower die, flattening the donor pockets and drawing additional metal afforded by the donor pockets into the predicted high strain areas while forming the intermediate part into the part.

2. The method of claim 1 further comprising identifying the predicted areas of high strain and low strain in the part when formed in a stamping operation.

3. The method of claim 1 further comprising identifying the predicted areas of high strain and low strain in the part when formed in a single-sided forming operation.

4. The method of claim 1 further comprising forming the donor pocket in the intermediate part in a first direction that is opposite to a second direction in which the intermediate part is drawn to form the part.

5. The method of claim 1 further comprising forming the donor pocket into an arcuate cross-sectional shape.

6. The method of claim 1 further comprising modeling the part to identify the predicted areas of high strain and of low strain in the part when formed in a stamping operation.

7. The method of claim 6 further comprising identifying predicted areas of low strain that are adjacent to predicted areas of high strain and performing the step of forming the blank in the predicted areas of low strain that are adjacent to predicted areas of high strain.

8. The method of claim 1 further comprising forming a test blank marked with a grid to identify areas of high strain that are adjacent to areas of low strain, identifying a donor pocket area in the blank in one of the areas of low strain and designing the donor pocket in the intermediate part.

9. The method of claim 1 wherein the blank is meshed with a grid of finite elements to perform numerical analysis and further comprising analyzing the part to identify a discrete area of higher strain in the part and defining the shape of a donor pocket to increase the extent to which the donor pocket is drawn into the predicted high strain area.

\* \* \* \* \*